United States Patent [19]
Hopcroft et al.

[11] Patent Number: 6,154,215
[45] Date of Patent: *Nov. 28, 2000

[54] METHOD AND APPARATUS FOR MAINTAINING MULTIPLE REPRESENTATIONS OF A SAME SCENE IN COMPUTER GENERATED GRAPHICS

[75] Inventors: Michael Hopcroft, Kirkland, Wash.; Brian Cabral, San Jose, Calif.

[73] Assignee: Silicon Graphics, Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/910,571

[22] Filed: Aug. 1, 1997

[51] Int. Cl.[7] .................................................. G06F 17/00
[52] U.S. Cl. ................................................................ 345/418
[58] Field of Search ................................ 345/418, 440, 345/441

[56] References Cited

U.S. PATENT DOCUMENTS 5,561,747 10/1996 Crocker et al. ........................ 345/441
5,825,368 10/1998 Wilks ..................................... 345/441

*Primary Examiner*—Mark R. Powell
*Assistant Examiner*—Huedung X. Cao
*Attorney, Agent, or Firm*—Wagner, Murabito & Hao LLP

[57] ABSTRACT

A method for creating and maintaining a dual scene graph for the display of a computer generated object. The user creates a user scene graph which has a number of node in a hierarchical organization which represents an object. This user scene graph is organized according to the dictates of the user for ease of human comprehension. The computer system automatically converts this user scene graph into a separate scene graph. The organization of this second scene graph is optimized so that the object can be rendered faster and more efficiently. Thereby, the first scene graph is displayed to the user so that the user can add, delete, or otherwise modify the object. Any changes made to the user scene graph are automatically made to the second scene graph, transparent to the user. The object is rendered for display according to the second scene graph.

35 Claims, 13 Drawing Sheets

METHOD AND APPARATUS FOR MAINTAINING MULTIPLE REPRESENTATIONS OF A SAME SCENE IN COMPUTER GENERATED GRAPHICS

FIELD OF THE INVENTION

The present invention relates to a method and apparatus for maintaining two or more representations of the same scene graph for the display of computer generated images.

BACKGROUND OF THE INVENTION

Computer graphics is used in a wide variety of applications, such as in business, science, animation, simulation, computer-aided design, process control, electronic publication, gaming, medical diagnosis, etc. In an effort to portray a more realistic real-world representation, three dimensional objects are transformed into models having the illusion of depth for display onto a two-dimensional computer screen. This is accomplished by using a number of polygons to represent a three-dimensional object. Next, a scan conversion process is used to determine which pixels of a computer display fall within each of the specified polygons. Thereupon, texture is selectively applied to those pixels residing within specified polygons. In addition, hidden or obscured surfaces, which are normally not visible, are eliminated from view. Finally, lighting, shading, shadowing, translucency, and blending effects are applied.

For a high resolution display (1024×1024) having over a million pixels, for which values must be generated for each and every pixel, displaying a three-dimensional scene on a computer system is a rather complicated task and requires a tremendous amount of processing power. Furthermore, the computer system must be extremely fast for it to handle dynamic computer graphics for displaying three-dimensional objects that are in motion. Indeed, even more processing power is required for interactive computer graphics, whereby 3-D images change in response to a user input (e.g., flight simulation). And as a scene becomes "richer" by adding more details and objects, more processing computation is required to render that scene. It is an extremely complex task for a computer to render millions of pixels in order to render these amazingly complex scenes.

In light of the enormous difficulties associated with creating and displaying computer generated images, there have been efforts to develop high level programming languages, such as Virtual Reality Meta Language (VRML), in an effort to greatly simplify this task. VRML files are formatted in such a way so that resident graphics engines can use the same basic building blocks stored in a library to construct realistic 3-D images, analogous to snapping together Lego blocks. A graphics application programming interface (API) is then used to take advantage of the powerful and extensive feature sets of high level programming languages. Basically, an API is comprised of a library of commands that allows a programmer to best utilize the graphics hardware in a computer. In designing the API, proper and careful attention must be directed in the selection of which features and attributes are to be included (e.g., geometric morphing, view culling, levels of detail, 3-D audio, texture mapping, modeling, transformation, color, NURBS, fog, alpha blending, smooth shading, motion blur, etc.). In particular, the definition of a scene graph containing geometry, sound, and a transformation hierarchy dramatically impacts how efficiently an object can be rendered for display.

Unfortunately, the ways in which a human would intuitively organize a scene graph is oftentimes not the most efficient way for a computer system to render that scene. For example, a human might organize a car according to functionality. The car consists of a body, engine, wheels, etc. In turn, the engine consists of an engine block, pistons, a carburetor, etc. However, for rendering purposes, it might be more efficient to render the car according to spatial criteria. For example, it might be faster to render the front of the car, then the middle of the car, and finally, the backend of the car. Alternatively, it might be faster to render an object according to its graphics state or node changes. For example, instead of rendering a blue car hood, a black front wheel, a blue car door, a black rear wheel, and then a blue trunk, it is faster for rendering purposes, to render all of the black tires at the same time and then render all the blue body parts at one time. In this manner, there are only two color changes as opposed to having to switch the color four different times. There are also other factors to be considered when organizing a scene graph for optimal rendering. These factors include the object's granularity, level of detail, culling, picking and highlighting, and tessellation. Hence, there exists a dilemma in choosing how a scene graph is to be organized. On the one hand, the scene graph should be organized according to a humanistic framework for the benefit of a human user. On the other hand, the scene graph should be organized so that it can be rendered faster and more efficiently by a computer system.

The present invention offers a solution to this dilemma by maintaining two or more distinct representations of the same scene graph. One representation is organized so that it is intuitive to a human user. The other representation is organized so as to optimize rendering performance. In the present invention, the different representations are interrelated such that when the user makes a change in the user representation, the change is automatically and transparently carried over and reflected in the other representation(s). When the computer actually goes to render the scene graph, it selects and uses the representation that has been specially optimized for rendering purposes. Thereby, the present invention allows the best of both cases in that it is now possible to have fast, efficient rendering without sacrificing ease of human interface.

SUMMARY OF THE INVENTION

The present invention pertains to a method and apparatus for creating and maintaining multiple scene graphs for the display of a computer generated object. The user initially creates a user scene graph which is comprised a number of nodes arranged in a hierarchical organization. These nodes represent all of the characteristics of the object so that the object can be modeled by a computer system and visually displayed to the user. In the present invention this "user" scene graph is organized according to the dictates of the user so that it can be more easily comprehended and used by a human. Thereupon, the computer system automatically converts this user scene graph into a separate "rendering" scene graph. The organization of this rendering scene graph is different from that of the user scene graph in that the latter is optimized so that the object can be rendered faster and more efficiently by the computer system. Whereas the user scene graph is organized from a human perspective for the sake of the user, the rendering scene graph is organized from a computer standpoint for the sake of faster rendering. Thereby, the first scene graph is displayed to the user so that the user can add, delete, or otherwise modify the object, but the object is rendered for display according to the second scene graph. Any changes made to the user scene graph are automatically made to the second scene graph, transparent to the user. Other embodiments of the present invention include ways in which the rendering scene graph can be optimized and ways for maintaining the rendering scene graph.

BRIEF DESCRIPTION OF THE DRAWINGS

The operation of this invention can be best visualized by reference to the drawings.

DETAILED DESCRIPTION

A method and apparatus for maintaining two or more representations of the same scene graph for the display of computer generated images is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 1:
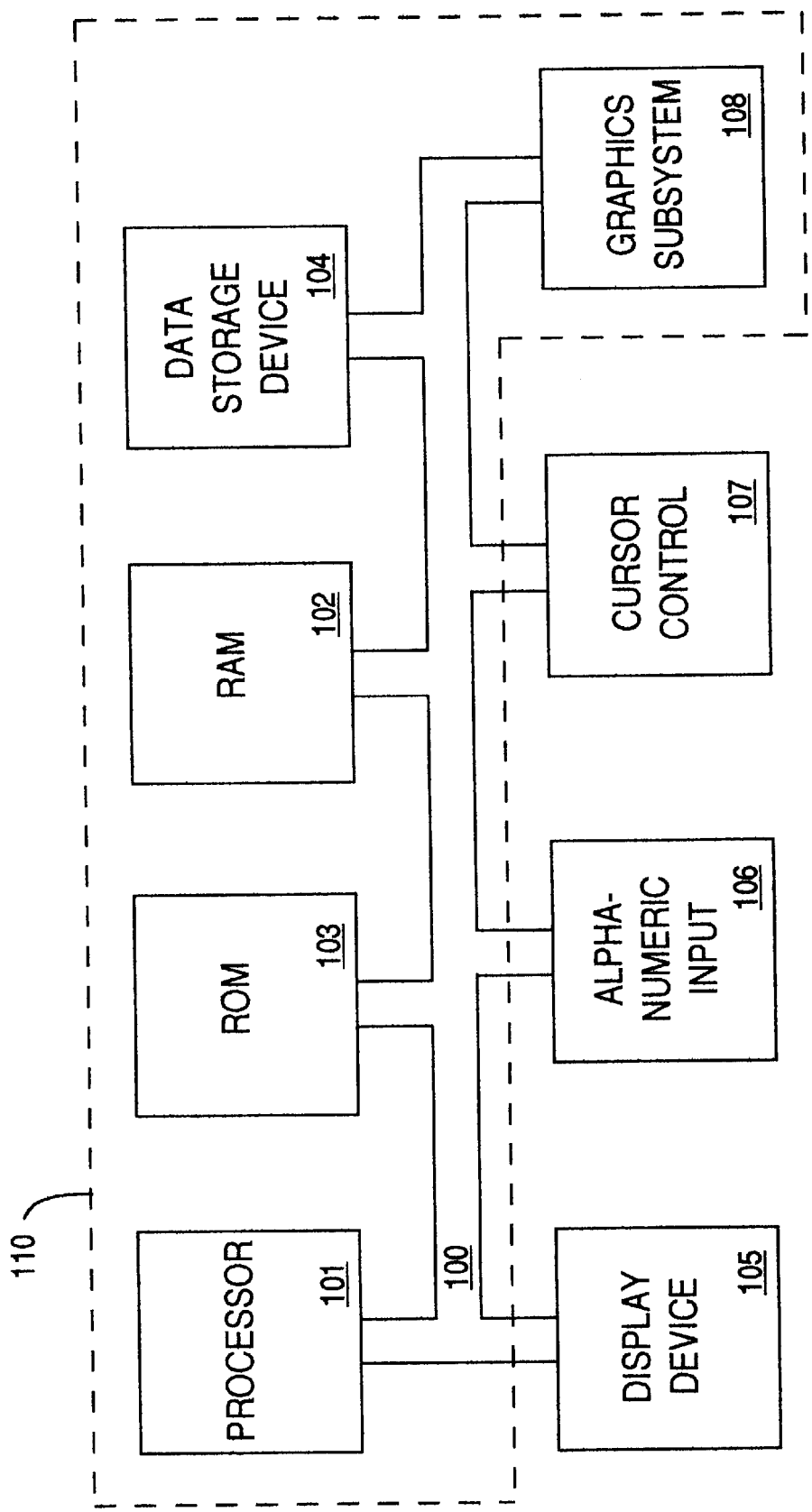
FIG. 1 shows a computer system upon which the present invention may be practiced.

Referring to FIG. 1, a computer system upon which the present invention may be practiced is shown. Initially, an original 3-D scene is created and described in a file format (e.g., VRML) by a programmer. The programmer describes both the components of the scene (e.g., geometry, materials, lights, images, movies, and sounds) as well as the relationships among those components. These relationships may be static (e.g., a transformation hierarchy) or dynamic (e.g., the values of transformations in the hierarchy). Changes in one element of the scene may be made to effect changes in others. For instance, a change in the position of a light-bulb shaped geometry can be made to cause a change in the position of a light source. In addition, information about the locations and characteristics of viewpoints may be included in the scene. Once created, the files are stored in the storage device 104 (e.g., hard disk drive) of computer system 110.

In the currently preferred embodiment, a retained mode graphics model is adopted. Basically, in a retained mode graphics model, a number of persistent data objects, as defined by the programmer, are stored in the local storage device 104 of the computer system 110. The data objects consist of geometry, graphics state, transformation hierarchy, and audio information. These persistent objects represent the basic building blocks used to construct a scene graph. A scene graph is an organization of nodes which represents an image stored in a memory or database. Scene graphs may also be referred to as hierarchies, and portions of a scene graph are called subgraphs. The scene graphs are structured as a collection of class hierarchies. There are classes for the nodes that make up the scene graph, the data objects that embody the graphics state, and the means for assembling the nodes and graphics states into a cohesive scene graph. The Node is an abstract representation for objects which may be connected in a scene graph. Nodes may have one or more dependent or "child" nodes. A Node has a bounding sphere which encompasses the geometric extent of itself and all its children. Usually, groups selectively traverse one or more of their children or define some state, for example a transformation, which affects all their descendants. Such state is said to be inherited by the descendants of the group node. Inherited state may be cumulative, (e.g., transformations), or not. Leaf nodes in the scene graph typically contain renderable objects, (e.g., sound or geometry), and inherited state affects how they are rendered. For example, the inherited transformation positions sound and geometry in the world. The inherited state in effect at a leaf node is determined by a traversal which visits all nodes on the path from the root of the traversal to the leaf node, accumulating inherited state along the way. Different traversals are defined for different actions, such as rendering and intersecting. The structures which initiate traversals and which maintain traversal state are called actions. Since it is accumulated with a traversal, inherited state is also referred to as traversal state. In practice, applications running on processor 101 will be used to build a scene graph, instantiate a DrawAction, and apply( ) it to the root of the scene graph in order to have a graphics subsystem 108 draw it onto a display device 105. Optionally, the user may choose to edit the 3-D scene by inputting specific commands via input device 115 (e.g., a keyboard, mouse, joystick, lightpen, etc.). The user may also interact with the 3D scene (e.g., flight simulation, game playing, etc.) through user input device 115.

Figure 2:
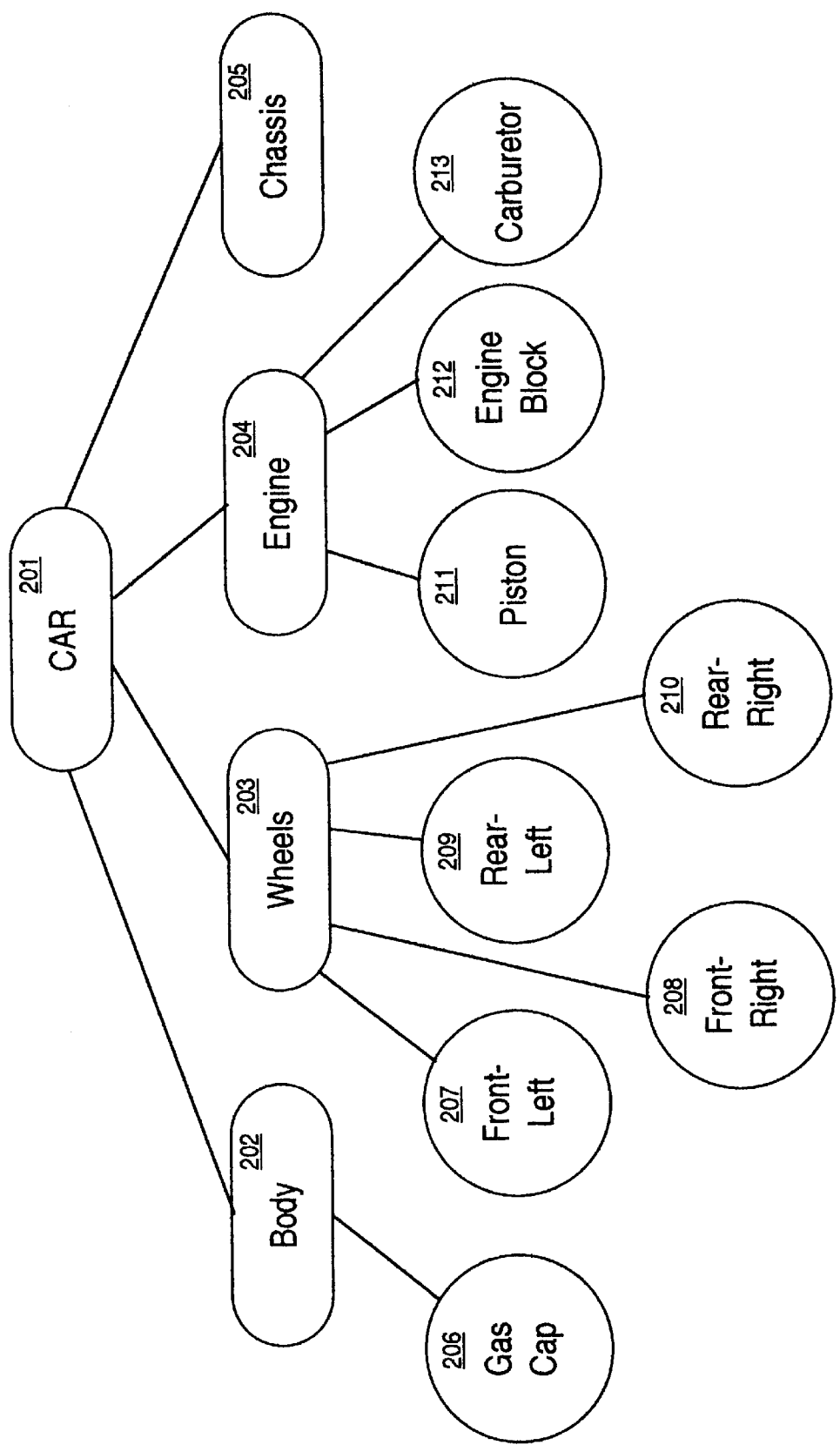
FIG. 2 shows an exemplary user scene graph of a car.

One of the keys to how fast the scene graph can be rendered relates to how it is structured or organized. In the present invention, multiple scene graphs are created and maintained to represent the same object or image. In particular, of the multiple scene graphs maintained, one scene graph is dedicated to facilitate the human user interface corresponding to the object or image to be rendered. In such a "user" scene graph, the user creates the scene graph according to his or her dictates. Often, the user decides to implement a top-down hierarchical format. FIG. 2 shows an exemplary user scene graph of a car. The overall image of the car is represented by node 201. In turn, the car node 201 is comprised of the body 202, wheels 203, engine 204, and chassis 205 nodes. Each one of these nodes can have its own set of nodes as well. For example, a gas cap node 206 can be created as part of the body node 202. The wheels can be further broken into the front-left 207, front-right 208, rear-left 209, and rear-right 210 nodes. Likewise, the engine node 204 can be subdivided into piston 211, engine block 212, and carburetor 213 nodes. This hierarchy can be extended to greater detail by adding more levels of nodes.

Figure 3A:
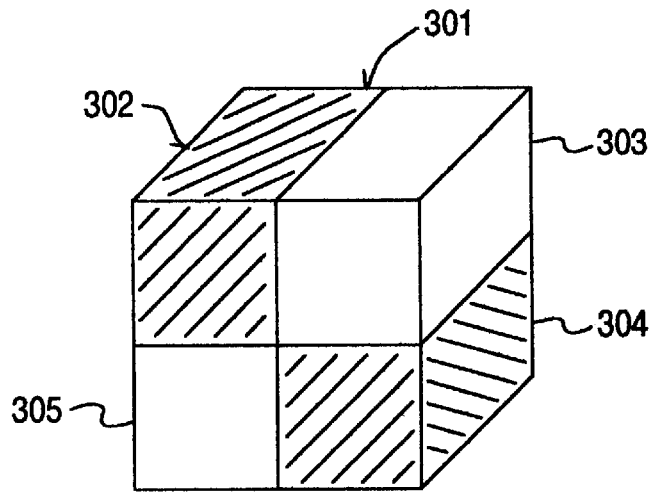
FIG. 3A shows an exemplary object for display.
Figure 3B:
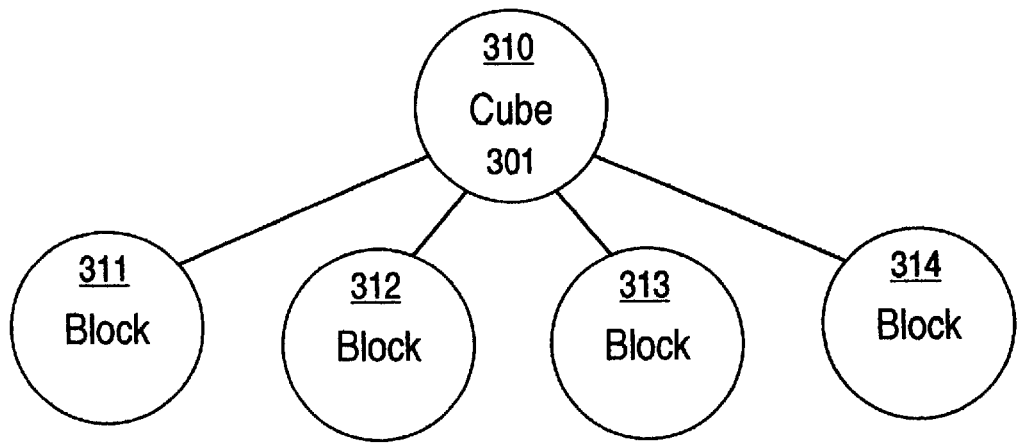
FIG. 3B shows a user scene graph representing the object depicted in FIG. 3A.
Figure 3C:
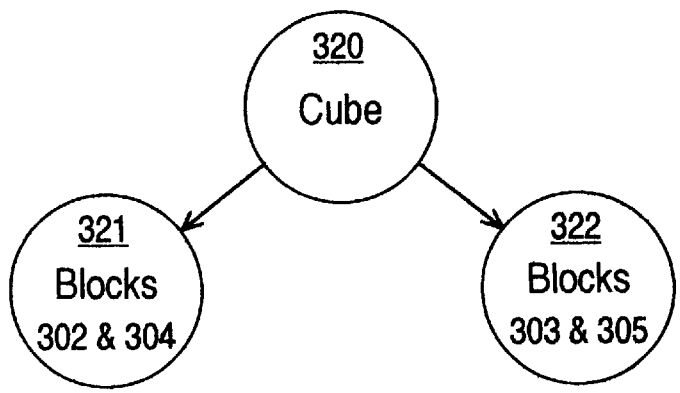
FIG. 3C shows a rendering scene graph representing the object depicted in FIG. 3A.

The computer system also includes software which automatically converts the user scene graph into a separate scene graph which is organized for more optimal rendering. In one embodiment, this separate scene graph is organized according to the object's graphics state, such as color, material, and/or other properties (e.g., highlight, surface, transparency, etc.). By thusly organizing the scene graph, the switching overhead can be minimized. FIG. 3A shows an exemplary object which can be organized into a more efficient scene graph for rendering purposes. The cubic object 301 has four block represented as 302–305. Blocks 302 and 305 are of a different color than that of blocks 303 and 304. A user might choose to construct a user scene graph as shown in FIG. 3B. The cube is represented by node 310. Node 310 has four children nodes 311–314 which represent the four blocks 302–305. If the user scene graph were to be used for rendering, the dark block 302 would first be rendered, then the color would need to be changed to render the light block 303, followed by the dark block 304; and finally the light block 305. This requires that the color be switched three times. FIG. 3C shows a scene graph which has been optimized for rendering. The cube is represented by node 301. In this scene graph, there are only two nodes depending off of node 301. Node 321 represents blocks 302 and 304; node 322 represents blocks 303 and 305. The computer system would render both dark blocks at the same time, switch colors, and then render both light blocks at the same time. In this scheme, there is only one color switch. Switching colors is time-consuming. By minimizing the number of times the color is switched, the rendering can be performed faster. Similarly, the scene graph can be organized to minimize node switches with respect to textures, transparencies, etc.

Figure 4A:
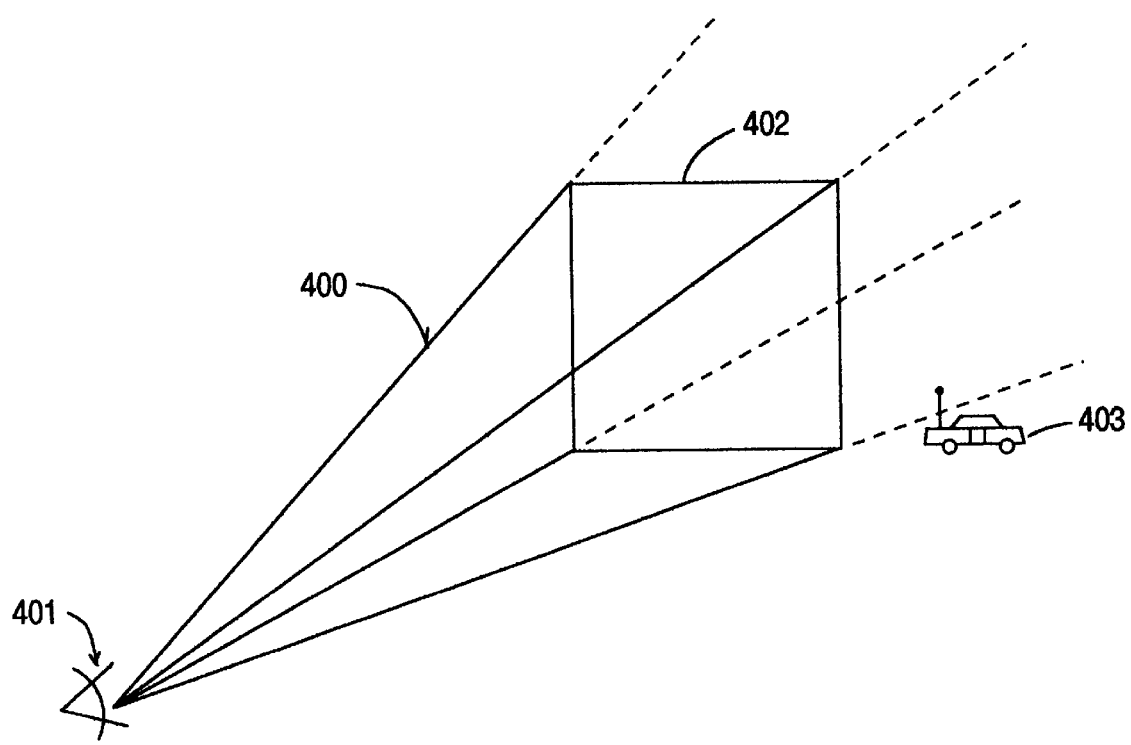
FIG. 4A shows a view frustum for determining whether an image is to be displayed on computer screen.
Figure 4B:
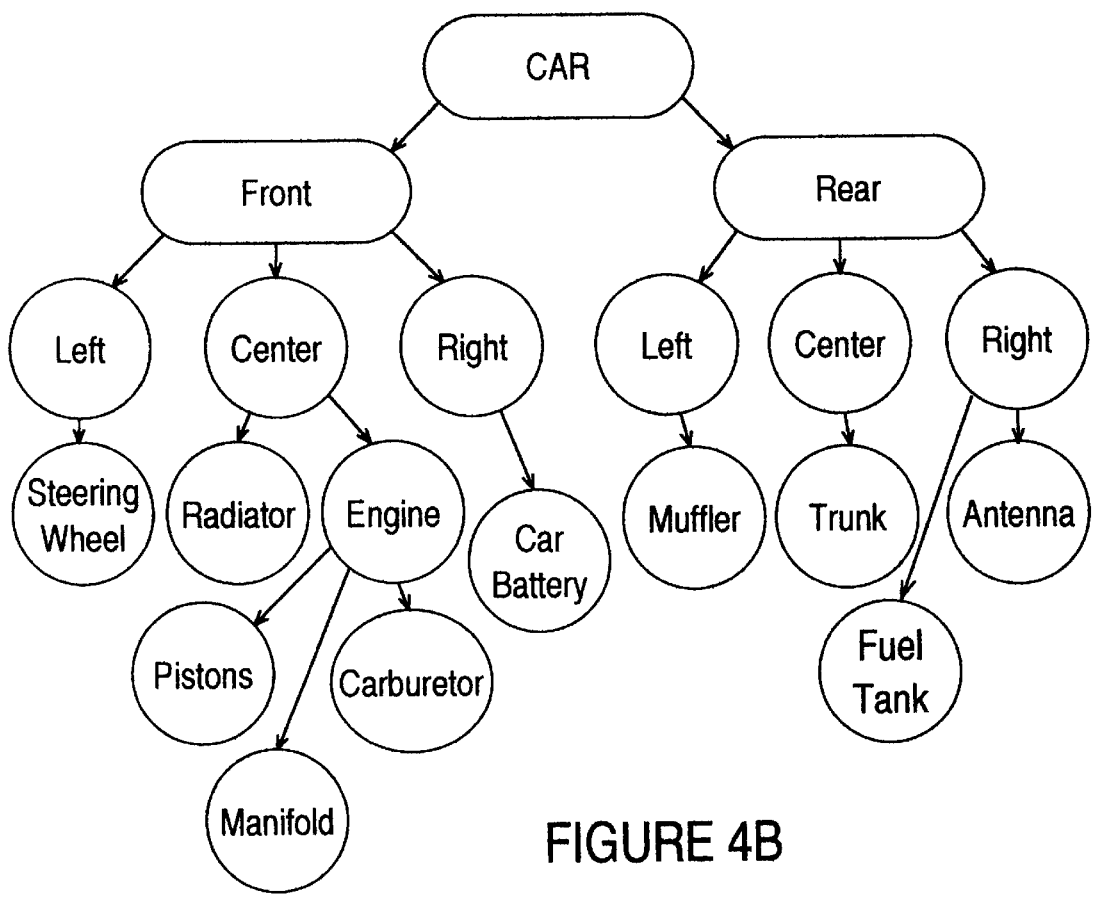
FIG. 4B shows an exemplary scene graph for rendering an entire car, part of which is in the view frustum of FIG. 4A.
Figure 4C:
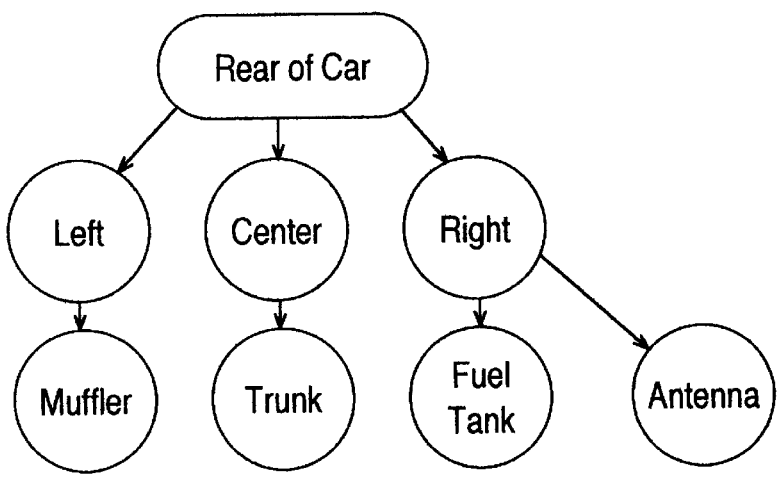
FIG. 4C shows a scene graph which only renders the rear of the car containing the part that was in the view frustum of FIG. 4A.

Another method for improving the rendering process relates to regulating the granularity and culling of geosets. Geosets are a collection of related primitives, such as points, lines, and polygons (especially triangles). Hence, the geoset for rendering a car might include hundreds of primitives for rendering the door, hood, wheels, hubcaps, antenna, windshield, wiper blades, head lights, tail pipe, etc. Unfortunately, one cannot render just a portion of a geoset. This means that if just a small portion of the car (e.g., just the antenna) is actually shown on the computer screen, the entire geoset must, nevertheless, be rendered. It is highly inefficient to render the entire geoset just to display the small piece of a car antenna which happens to fall in the viewer frustum. One solution to this problem is to subdivide the original geoset into two or more smaller, subdivided geosets. Thereby, a lesser number of primitives would need to be rendered. This solution is demonstrate in FIG. 4A which shows a view frustum 400 from view point 401 for determining whether an image is to be displayed on computer screen 402. Anything falling into the boundary of view frustum 400 should be displayed. In this example, since the antenna of car 403 protrudes into the view frustum 400, the geoset containing the antenna should be rendered. Rather than having one large geoset representing the entire car 403, a smaller geoset can be constructed. FIG. 4B shows an exemplary scene graph for rendering an entire car. For purposes of illustration, only twenty nodes are shown. A real scene graph of a car would likely contain hundreds or even thousands of such nodes. This original scene graph can be broken into two separate scene graphs. One scene graph would be used to render the front of the car, while another scene graph would be used to render the rear of the car. FIG. 4C shows a scene graph which only renders the rear of the car. Thereby, instead of rendering the entire car, just the rear of the car which includes the antenna can now be rendered. This reduces the overall number of primitives which must be rendered.

However, there is a fixed amount of processing time that is required to set up any given geoset. In particular, the computer system must perform tests to determine if any portion of a geoset is included in the viewer frustum 400. As a result, having an excessive number of smaller geosets can actually tend to increase the rendering time due to the cumulative time it takes to set up all of the numerous geosets. Thus, there is a trade-off in determining the size and number of geosets for minimizing the drawing time and set-up time. In one embodiment of the present invention, software automatically calculates the most optimal number of geosets and maintains a separate scene graph accordingly.

Figure 5:
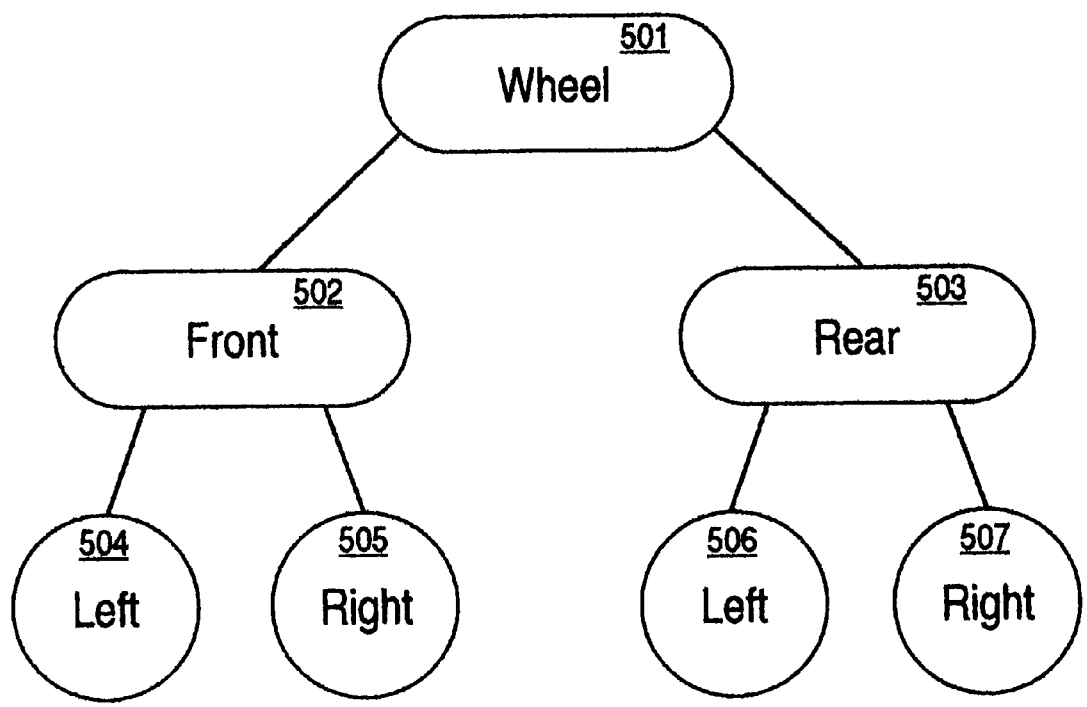
FIG. 5 shows a scene graph having a spatial organization.

Another method for optimizing the organization of a scene graph relates to spatialization. By arranging the nodes of a scene graph in a spatial order, particular nodes of the branches of the scene graph which do not appear in the viewer frustum, will not need to be rendered. FIG. 5 shows a scene graph having a spatial organization. Since all wheels of a car basically look alike, a single node 501 can be used to represent all four wheels of a car. Node 502 represents the front wheels, and node 503 represents the rear wheels. Node 504 represents the front-left wheel; node 505 represents the front-right wheel; node 506 represents the rear-left wheel; and node 507 represents the rear-right wheel. Thereby, if only the front portion of the car is displayed in the viewer frustum, the nodes 503, 506, and 507 of the right branch of the scene graph representing the back portion of the car, need not be rendered. In one embodiment of the present invention, a separate scene graph based on a spatial organization is created and maintained.

Figure 6:
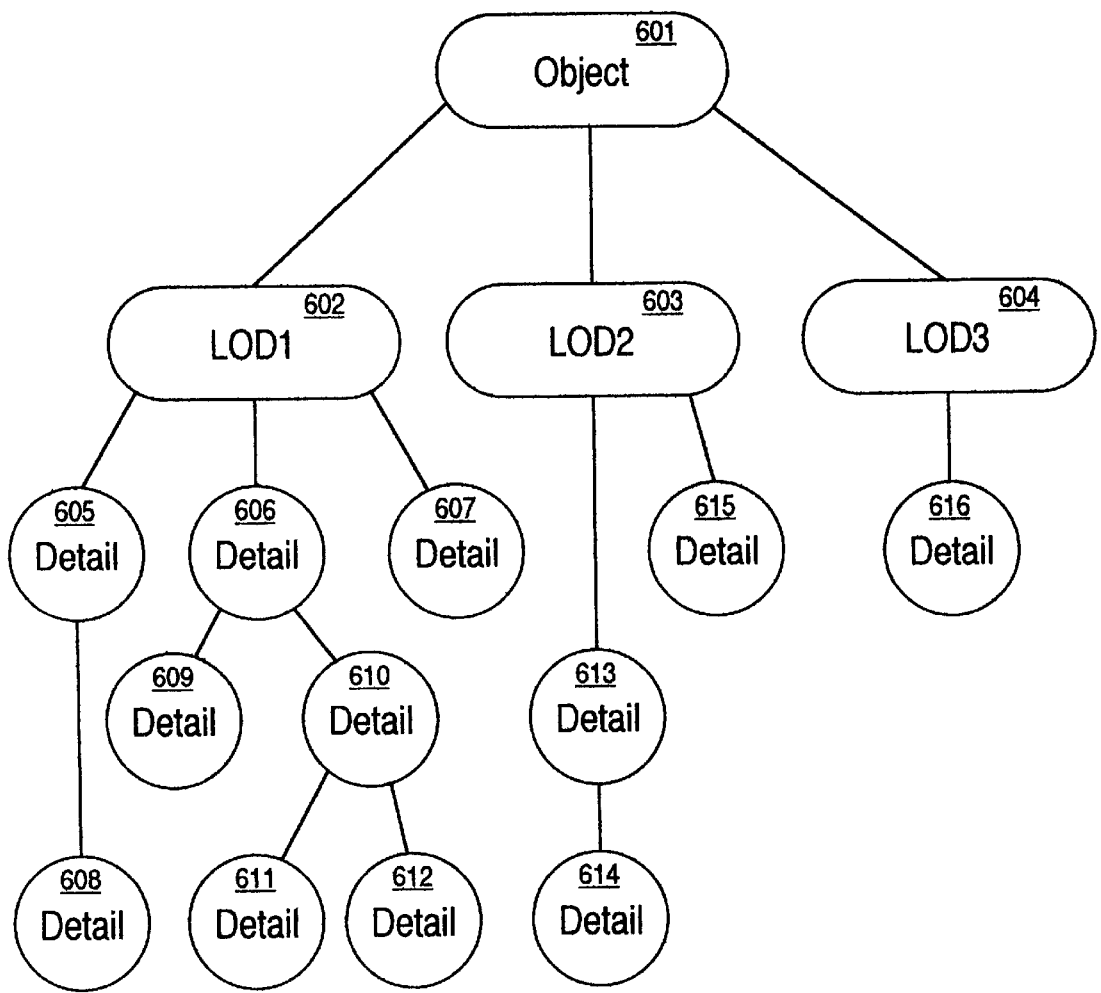
FIG. 6 shows an LOD node of a scene graph.

Yet another method for structuring a scene graph from a rendering perspective, pertains to the implementation of a level-of-detail (LOD) node. Basically, a LOD node is a switch which selects amongst its children based on its distance from the eyepoint. Level-of-detail is a technique for manipulating model complexity based on image quality and rendering speed. Typically, a model is drawn in finer detail when dose to the viewer (occupies large screen area) than when it is far away (occupies little screen area). In this way, costly detail is drawn only when it can be resolved. The distance to an LOD is defined as the distance from the eyepoint to the LOD center. This distance, computed during traversal, selects a child based on the ranges array as follows: no child is selected if ranges[0]>distance or ranges[last]<distance and child "i" is selected when ranges[i]<distance<=ranges[i+1]. Referring to FIG. 6, an LOD node of a scene graph is shown. The LOD of an object is represented by node 601. Three LODs are shown in this example. The LOD1 of node 602 is used when the object is close to the viewer. It has a higher degree of detail as represented by the many nodes 605–612. When the object moves farther away from the viewer, the LOD is switched to LOD2 of node 603, which has a less degree of detail. LOD2 only has three corresponding nodes 613–615. When the objects gets further towards the horizon, the LOD3 of node 604, which has the least amount of detail, is selected. By switching to the appropriate LOD, the scene graph is optimized to minimize the amount of detail which need to be rendered. Thereby, in this embodiment of the present invention, a LOD node is used to optimize the scene graph(s) used for rendering purposes.

Figure 7:
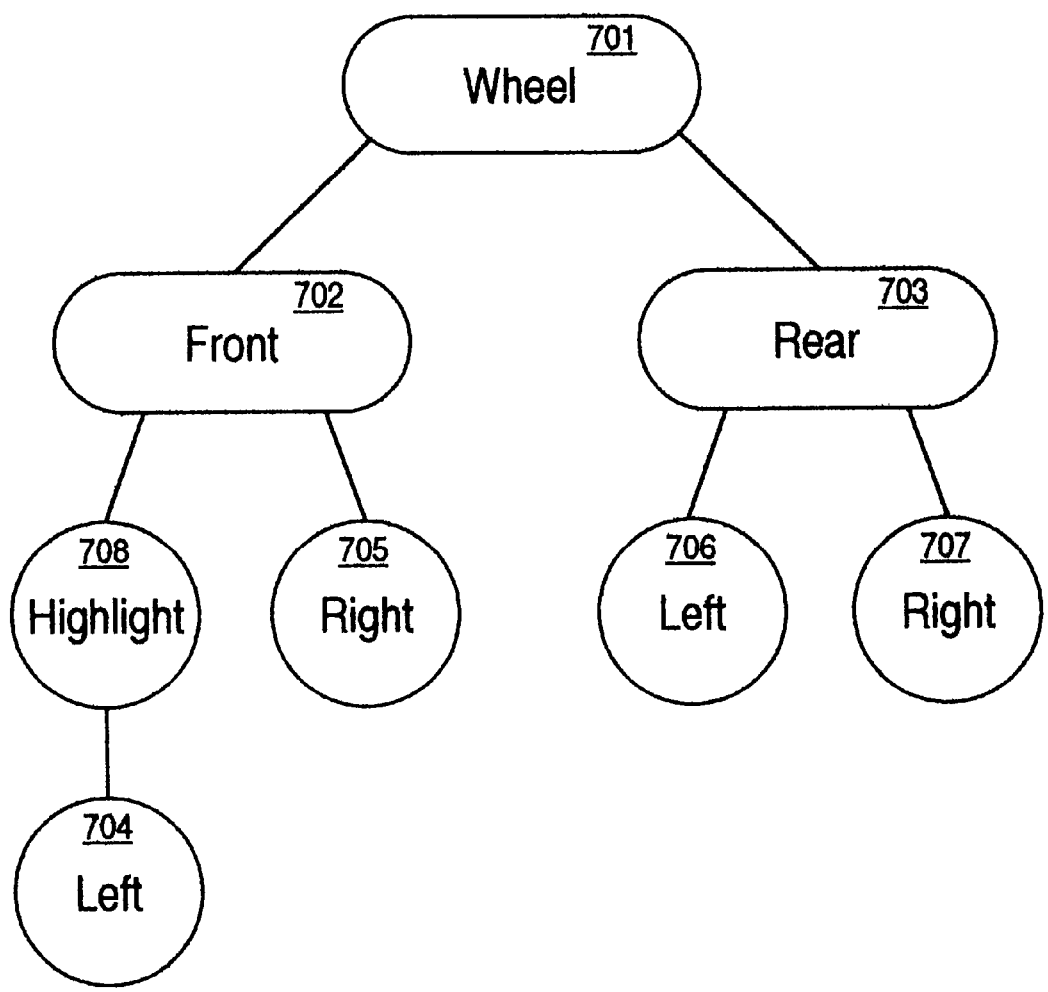
FIG. 7 shows a scene graph optimized for rendering in which picking and highlighting functions are applied.

In one embodiment of the present invention, picking and highlighting are more readily accomplished by implementing these functions on the scene graph optimized for rendering rather than the user scene graph. Implementing picking and highlighting in this manner is advantageous because it results in less confusion for the user. Since picking and highlighting are not physically part of the object, the user does not see these functions in his or her user scene graph. Otherwise, it can be confusing for the user. FIG. 7 shows a scene graph optimized for rendering in which picking and highlighting functions are applied. Suppose that the user wishes to pick the rear-right wheel, the user would position a cursor with a mouse over that wheel and click on it. In response, the computer system would correlate the selection to the user scene graph. Next, a return path is traced with respect to the rendering scene graph node. This path is then converted to the user scene graph. The CAD system would then display the selected object. If the front-left wheel is to be highlighted, a highlight node 708 is inserted above the front-left wheel node 704. Inserting a highlight node causes all child nodes depending from the highlight node to become highlighted.

In another embodiment, curves and curved surfaces are more efficiently rendered by using the multi-scene graph of the present invention. In computer graphics, curves and curved surfaces are approximated by using tessellation, Bezier functions, splines (e.g., Non-Uniform Rational B-Splines), polygon meshes, parametric polynomial curves, parametric bivariate polynomial surface patches, quadric surfaces, bicubic surfaces, etc. These representations are often quite complex. Hence, simplified representations of the curves and curved surfaces are depicted in the user scene graph for ease of comprehension for the benefit of the user; whereas the more complex and realistic representations are given in the scene graph(s) used for rendering. For example, a sphere can be represented as a node having a centerpoint and a radius for the user scene graph. The same sphere can be represented in a separate scene graph as one or more nodes defining a polygonal mesh.

It should be noted that the present invention is not limited to having just two separate scene graphs. Indeed, there can be two or more scene graphs. Furthermore, separate scene graphs can be used to not only accelerate rendering, but can also be used in other related graphical operations. For example, a separate scene graph can be used to perform picking or selecting. Another example is to have a separate scene graph for performing searches. Yet another example is to have a separate scene graph to do collision detection. There are many other functions which could be optimized with the use of a separate scene graph.

Figure 8:
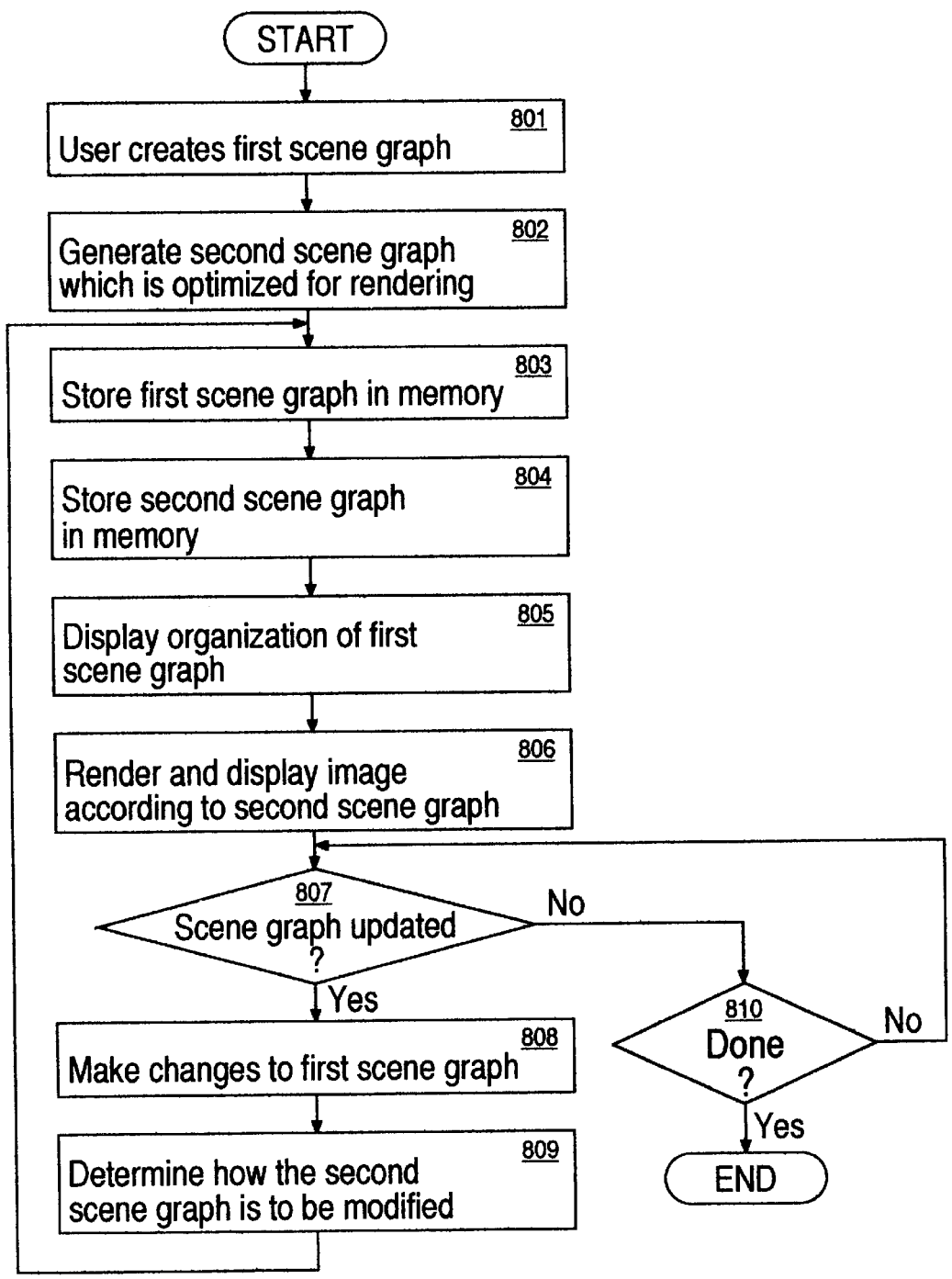
FIG. 8 is a flowchart describing the steps for making and using the present invention.

FIG. 8 is a flowchart describing the steps for making and using the present invention. In the first step 801, a user creates a first scene graph for displaying an image on a computer screen. As an example, a mechanical engineer can design a car on a computer-aided design (CAD) system. This new car design can then be modeled in 3-D on a computer screen according to the specifications of the first scene graph. Next, a second scene graph is automatically generated without any input or prompting from the user. The second scene graph also represents the same image as the first scene graph, except that it is organized in such a manner that it can more efficiently be rendered by a computer system. These two separate scene graphs are stored in memory, steps 803 and 804. The organization of the first scene graph can be called up by the user for display, step 805. However, in the currently preferred embodiment, this second scene graph is made transparent to and cannot be accessed by the user. It exists to improve the rendering process. In step 806, the image is rendered according to the second scene graph and displayed on a computer screen. The user may choose to update or alter the design in step 807. Any changes to the image are effected by making the changes to the first scene graph, step 808. The present invention automatically determines the necessary changes which have to be made to the second scene graph, step 809. After the two scene graphs have been appropriately updated, they are stored in memory; the updated first scene graph can be called up for review by the user; and the updated image is rendered for display according to the updated second scene graph by repeating steps 803–806. This process is repeated until there are no more changes, as determined by step 810, at which point the process is done.

Figure 9:
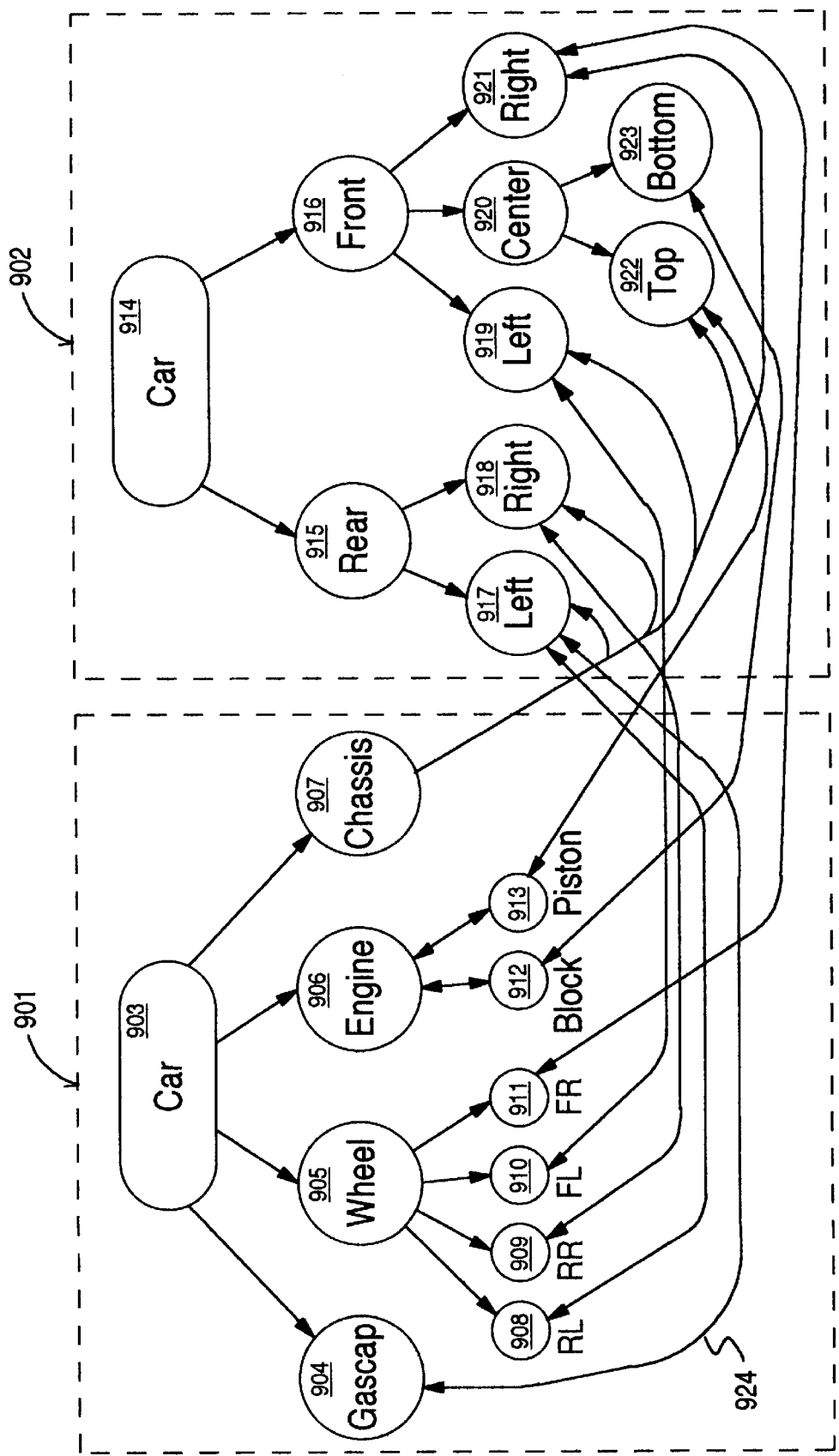
FIG. 9 shows the correspondence between a user scene graph and a rendering scene graph.

The process for automatically creating, updating, and otherwise maintaining the second scene graph, which has been optimized for rendering as described above, is now described. The rendering scene graph is constructed based on the user scene graph created by the user. Basically, the top, intermediate, and bottom nodes of the user and rendering scene graphs are different, but the bottom nodes from both scene graphs are shared. FIG. 9 shows the correspondence between a user scene graph and a rendering scene graph. The user scene graph 901 has a structure organized according to the user's preferences. In this example, the user has organized a car in a hierarchy according to its functions (e.g., gas cap node 904, wheels node 905, engine node 906, and chassis node 907). A constructor is then used to build an equivalent rendering scene graph 902. Scene graph 902 represents the same car as scene graph 901 except that its nodes have been re-categorized and has an hierarchical organization based on spatial criteria. It can be seen that the intermediate and bottom nodes are different (e.g., wheels 905 and engine 906 vs. rear node 915 and front node 916). However, there exists a correspondence between each of the bottom nodes of the user scene graph 901 with one or more bottom nodes of the rendering scene graph 902. The constructor includes information regarding this correspondence. For example, the gas cap node 904 corresponds to node 919 of the rendering scene graph because the gas cap is located in the rear left portion of the car. Similarly, the pistons node 913 of the user scene graph 901 corresponds to node 922 of rendering scene graph 902 because the pistons are located in the top-front-center section of the car. And the chassis node 907 corresponds to the rear-left, rear-right, front-left, front-center-bottom, and front-right nodes 917917, 919, 921, and 923.

If the user were to change one of the elements of the user scene graph, that change would be reflected in the corresponding nodes of the user scene graph and rendering scene graph. This is accomplished by changing the geosets of those nodes to effectuate the desired changes. But if one of the elements were to be moved, the correspondence or link between that user node of the user scene graph to the rendering node of the rendering scene graph would be changed by the constructor. For example, if the gas cap were to be made smaller, the geosets of nodes 904 and 917 would be changed to reflect the smaller size. However, if the gas cap were to be moved to the rear-right portion of the car, the link 924 between nodes 904 and 917 would be eliminated, and a new link between nodes 904 and 918 would be established. The cost in terms of processing time for converting the user scene graph 901 into the rendering scene graph 902 is relatively small because it involves the addition of pointers which are few in comparison to the thousands of primitives in the geoset nodes. Essentially, ninety-nine percent of the data is contained in the geosets.

Thus, when an object is to be drawn, the user scene graph is converted over to the rendering scene graph. Conversely, when the user picks an element, a path is defined according to rendering scene graph and then converted back to the user scene graph. When the user adds a new node, the new node is shown in the user scene graph. The constructor then inserts a new node (if necessary) to the rendering scene graph. And if the two nodes happen to be bottom nodes (i.e., there are no dependent child nodes), then the constructor establishes a link between the two nodes. If the user decides to remove an old node, that node is removed from the user scene graph and any dependencies are resolved. The constructor makes the appropriate correction to the rendering scene graph.

Figure 10:
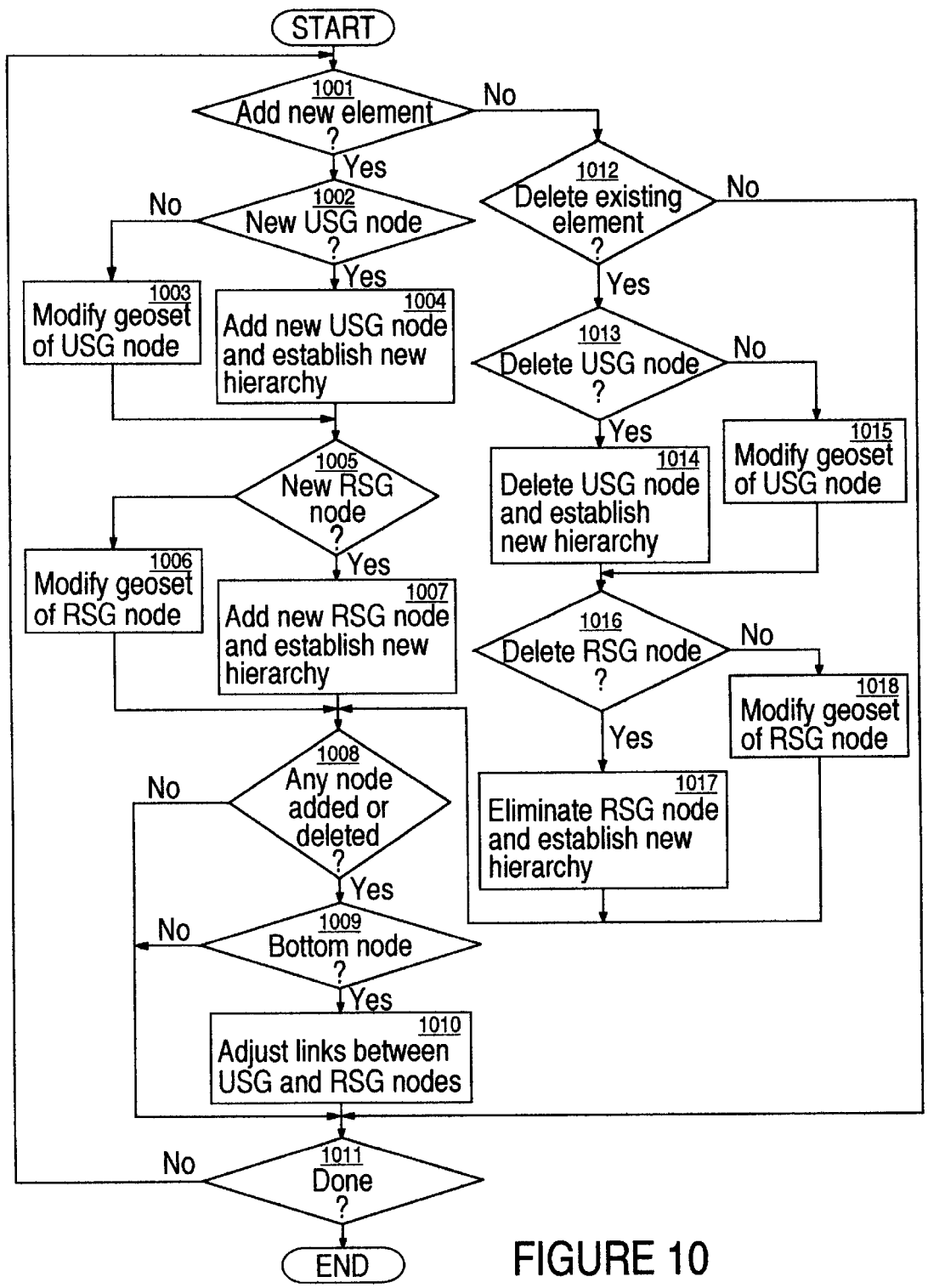
FIG. 10 is a flowchart describing the steps for creating a dual scene graph.

FIG. 10 is a flowchart describing the steps for creating a dual scene graph. The dual scene graph is created by adding and deleting elements of an object (e.g., a car) to be displayed. Initially, the user creates a first element, as determined by step 1001. This first element requires a node in the user scene graph (USG), as determined in step 1002. The node is added to the user scene graph, and since it is the first node, there is no hierarchy to be established yet, step 1004. Since the rendering scene graph does not yet have any nodes, step 1005 determines that a first node needs to be created. The first node is established in the rendering scene graph, and since it is the first node, a hierarchy is yet to be established, step 1007. Steps 1008–1010 establish a link between these first two nodes of the user and rendering scene graphs. In other words, a pointer is stored in memory, whereby the pointer associated with the user scene graph specifies the address, location, or other identifier of a particular node in the rendering scene graph.

The process then repeats when a next element is added. Step 1001 determines that the user wishes to enter another element. A determination is then made as to whether the new element requires a new node, step 1002. If the new element is to be incorporated as part of an existing node, the geoset of that node is modified so that the new element can be displayed, step 1003. Otherwise, a new node is added to the user scene graph, and a new hierarchy is established to account for the dependency or dependencies resulting from the addition of this new node, step 1004. Step 1005 determines whether a new node is required in the rendering scene graph. It should be noted that there is no one-to-one correspondence between nodes of the user scene graph and nodes of the rendering scene graph. The user scene graph can have more nodes than the rendering scene graph and vice versa. Consequently, a node in the user scene graph can none, one, or several corresponding nodes of the rendering scene graph and vice versa. If a new node is not required in the rendering scene graph, the geoset of an existing node in the rendering scene graph is modified to reflect the new element so that it can be rendered for display, step 1006. If a new node is required, it is added to the rendering scene graph and any new dependencies are also added to provide the appropriate hierarchy, step 1007. A determination is made in step 1008 as to whether any node has been added or deleted. In this case, if a node were added to either the user or rendering scene graphs in order to add the element to the object, step 1009 is performed. Step 1009 determines if the new node is a bottom node. If the new node is a bottom node (i.e., it does not have any dependents), then one or more links associated with the new node are created to establish a correspondence between the new node and one or more nodes of the other scene graph. If no nodes were added or if the nodes were not bottom nodes, step 1011 determines whether the user is done. If so, the process ends. Otherwise, the process is repeated with step 1001 again.

In creating the dual scene graphs, there may be instances whereby the user wishes to remove an element. Step 1012 is used to detect those instances whereby an element is to be deleted. When an element is to be deleted, step 1013 determines whether this calls for the elimination of an entire node in the user scene graph. If a node is to be eliminated, that node is deleted from the user scene graph and any modifications to the hierarchy are then made, step 1014 Otherwise, the geoset of the element to be removed is modified, step 1015. Step 1016 then determines whether deleting the element requires the elimination of one or more nodes in the rendering scene graph. If a rendering scene graph node is to be eliminated, the hierarchy has to be modified, step 1017. Otherwise, the primitives of the geoset corresponding to the element are modified prevent the element from being rendered for display, step 1018. For example, if a car designer wishes to delete the mud flaps of a car and a single node is used to portray the mud flaps, then that entire node is eliminated from the user scene graph, and the appropriate corrections are made to the rendering scene graph. However, if the mud flaps are part of geoset of a wheels node, then the primitives of that geoset corresponding to the mud flaps are deleted. Thereupon, step 1008 determines whether a node has been eliminated in either the user or rendering scene graphs. If a node were eliminated, step 1009 determines whether that node was a bottom node. If the eliminated node were a bottom node, its links are also eliminated, step 1010. Otherwise, the process skips to step 1011. Step 1011 determines when the user is finished with the design. At that point, the user scene graph is displayed to the user, whereas the rendering scene graph is used to render the object for display.

Figure 11:
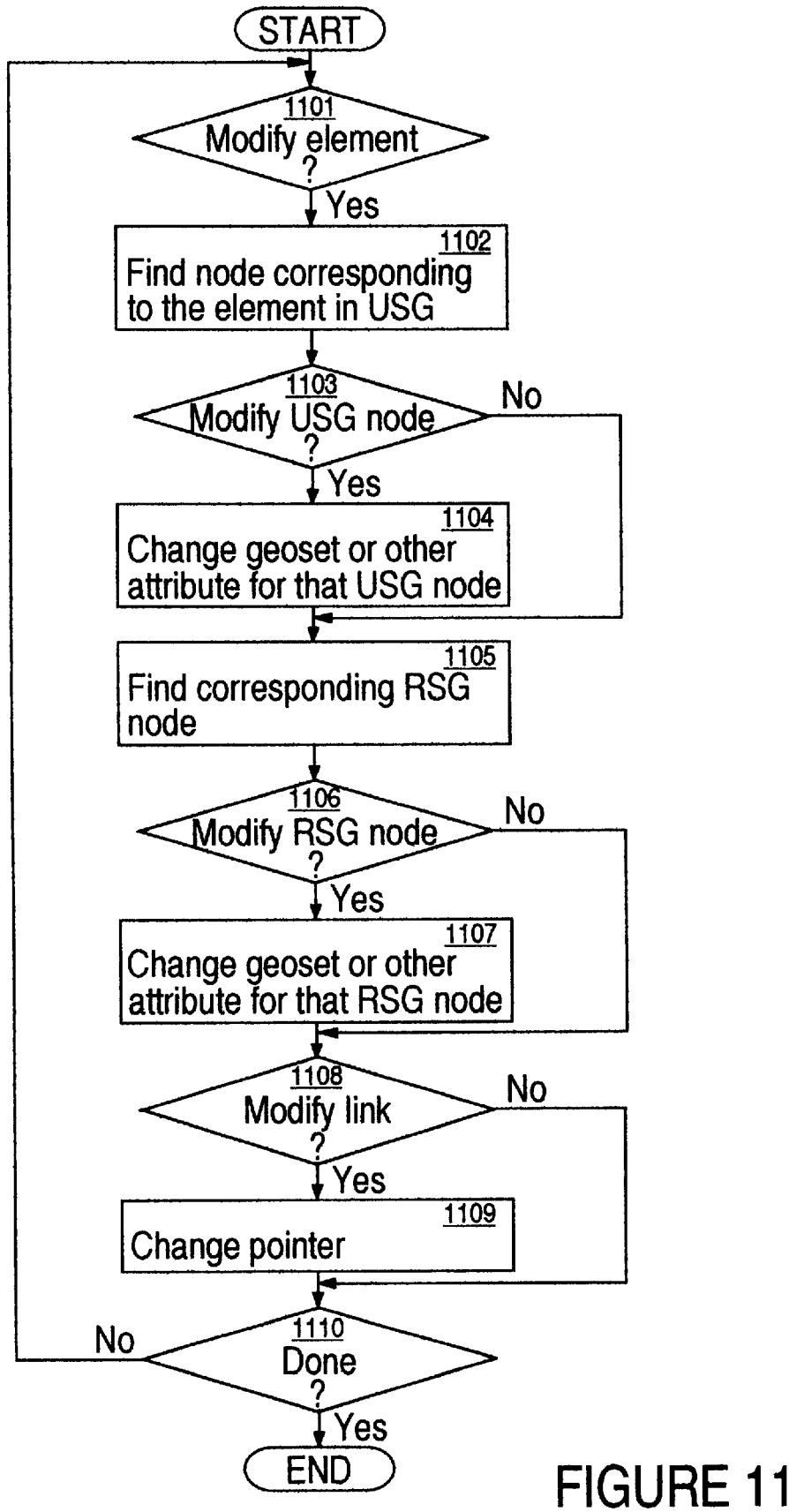
FIG. 11 is a flowchart describing the detailed steps for modifying an element of an object represented in a dual scene graph environment.

FIG. 11 is a flowchart describing the detailed steps for modifying an element of an object represented in a dual scene graph environment. When the user wishes to modify an element of an object, as determined in step 1101, the node in the user scene graph corresponding to that element is located, step 1102. A determination is made as to whether that node needs to be modified, step 1103. If the user scene graph node is to be modified, the primitives of the geoset or some attribute (e.g., transparency, texture, depth, color, etc.) of that node are changed according to the dictates of the user, step 1104. The node or nodes in the rendering scene graph are located according to the pointer or pointers associated with the user scene graph node, step 1105. A determination is made in step 1106 as to whether the rendering scene graph node need to be modified. If the rendering scene graph node is to be modified, the primitives of the geoset or some attribute (e.g., transparency, texture, depth, color, etc.) of that node are changed automatically based on the changes made to the user scene graph, step 1107. It should be noted that the user inputs the changes only to the user scene graph. These changes are then automatically ported over to the rendering scene graph without any intervention or action by the user. A determination is made in step 1108 as to whether one or more links need to be changed. A link needs to be changed for a rendering scene graph node if, for example, the element corresponding to a user scene graph node were to be moved. If a link is to be moved, this is accomplished by changing the pointer information so that the pointer points to the new node, step 1109. In step 1110, a determination is made as to whether the user is finished editing the elements. If so, the process ends. Otherwise, the process is repeated with step 1101. Alternatively, a user may make changes to an element or move an element by deleting that node from the user scene graph and inserting a new node in replacement thereof.

Figure 12:
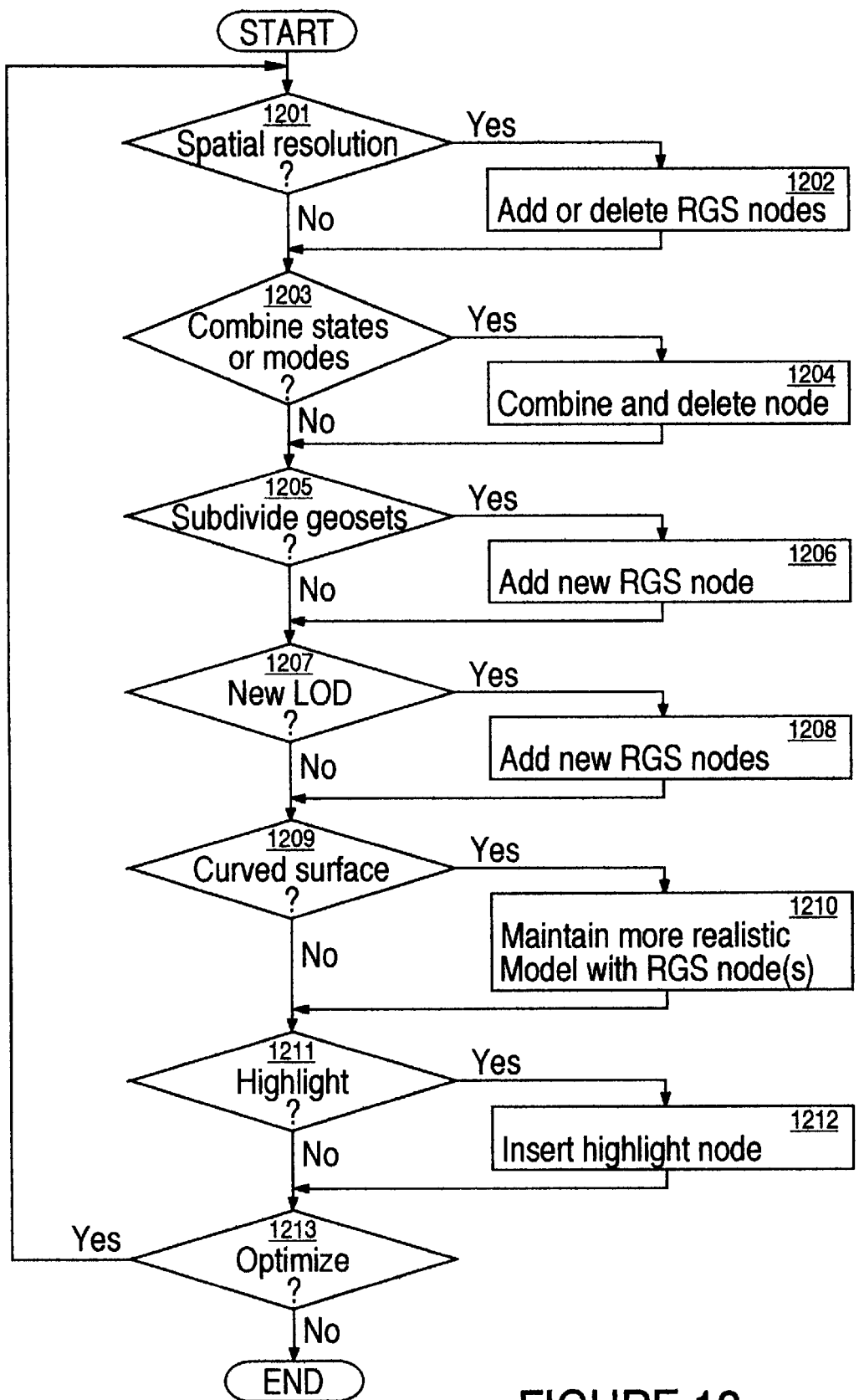
FIG. 12 is a flowchart describing in detail the steps for optimizing the rendering scene graph.

FIG. 12 is a flowchart describing in detail the steps for optimizing the rendering scene graph. Step 1201 determines whether a greater or lesser level of spatiality is required. If a greater degree of spatialization is needed, new nodes can be added, step 1202. For example, the engine block of a car can be subdivided into a right portion and a left portion by splitting what had been a single node in the rendering scene graph in two. Conversely, it might be faster from a rendering perspective to delete a node if the spatial resolution is reduced, step 1202. Next, a determination is made as to whether two or more states or modes can be combined, step 1203. If so, those states or modes are combined together into a single node in the rendering scene graph, step 1204. A determination is made as to whether geosets are to be subdivided in step 1205. Geosets are to be subdivided until their setup time exceeds the benefits conferred by having an extra subdivided geoset. If a geoset is to be subdivided, a new rendering scene graph node is created, step 1206. A determination is made in step 1207 as to whether a new level-of-detail is required. If so, a new LOD node and its corresponding detail nodes are added in the rendering scene graph, step 1208. If there are any curves or curved surfaces, as determined in step 1209, they are modeled with a more complex and realistic representations in the node(s) of the rendering scene graph of step 1210. Highlights can be accomplished by inserting a highlight node in the appropriate place in the rendering scene graph hierarchy, steps 1211 and 1212. The steps of 1201–1212 can be repeated until step 1213 indicates that there are no more further optimizations for the rendering scene graph. It should be noted however that in the currently preferred embodiment, the rendering scene graph is organized spatially, but that other organizations can be implemented as well. Furthermore, not all of the above optimizations need to be practiced and that other types of optimizations can be performed in conjunction with the multiple scene graph representations of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for rendering a computer-generated image for display, comprising the steps of:

creating a first scene graph which represents the entire image, wherein the first scene graph is viewable by the user;

storing the first scene graph in memory;

creating a second scene graph which represents the same entire image as the first scene graph, wherein the first scene graph and the second scene graph each independently represents the entire image, the first scene graph is organized to be optimally viewed by a user whereas the second scene graph is organized to optimally render the image;

storing the second scene graph in the memory;

accepting a change to the first scene graph made by the user;

changing the second scene graph to reflect the change made to the first scene graph;

rendering the image for display according to the second scene graph, wherein the image is rendered only from the second scene graph and not from the first scene graph.

2. The method of claim 1 further comprising the step of adding a node to the first scene graph.

3. The method of claim 1 further comprising the step of deleting a node from the first scene graph.

4. The method of claim 1 further comprising the step of changing a second node of the second scene graph in response to a change made to a first node of the first scene graph.

5. The method of claim 1 further comprising the step of establishing a correspondence between a first node of the first scene graph and a second node of the second scene graph.

6. The method of claim 5, wherein the correspondence is given by a pointer.

7. The method of claim 1 further comprising the step of optimizing the second scene graph for rendering the image.

8. The method of claim 7, wherein the optimizing step includes the step of organizing the second scene graph spatially.

9. The method of claim 7, wherein the optimizing step includes the step of minimizing state changes by grouping the state changes into one node.

10. The method of claim 7, wherein the optimizing step includes the step of minimizing mode changes by grouping the mode changes into one node.

11. The method of claim 7, wherein the optimizing step includes the step of dividing a geoset into two or more geosets, each of the geosets belonging to a separate node.

12. The method of claim 1 further comprising the step of adding a plurality level-of-detail nodes, wherein each of the level-of-detail nodes corresponds to a different resolution for displaying the image.

13. The method of claim 1 further comprising the steps of implementing a first node of the first scene graph for modeling a curved surface according to a first representation and implementing a second node of the second scene graph for modeling the curved surface according to a second representation.

14. The method of claim 1 further comprising the step of inserting a highlight node in the second scene graph to highlight one or more displayed elements.

15. The method of claim 1 further comprising the step of automatically maintaining a coherency between the first scene graph and the second scene graph, wherein when a user makes a change to the first scene graph, the change is reflected in the second scene graph.

16. The method of claim 1 further comprising the step of creating one or more scene graphs in addition to the first scene graph and the second scene graph for optimizing a graphical operation.

17. The method of claim 16, wherein the graphical operation includes collision detection.

18. The method of claim 16, wherein the graphical operation includes picking.

19. The method of claim 16, wherein the graphical operation includes searching.

20. A computer system for rendering an image for display, comprising:

a processor for creating a first data structure of the entire image and a second data structure of the same entire image, the first data structure and the second data structure each independently describing the same entire image, wherein the first data structure has an organization specified by a user and the second data structure has a different organization than that of the first data structure in a manner which allows the image to be rendered faster by using the second data structure in comparison to the first data structure and wherein changes to the first data structure made by the user are automatically made to change the second data structure such that the first data structure and the second data structure represent the same entire image;

memory coupled to the processor for storing the first data structure and the second data structure;

a rendering circuit coupled to the processor for rendering the image for display according to the second data structure, wherein the image is rendered from data supplied only from the second data structure and not from the first data structure;

a display coupled to the rendering circuit for displaying the rendered image, wherein the display can also be used to display the organization of the first data structure.

21. The computer system of claim 20 further comprising an interface coupled to the processor for inputting a node to the first data structure.

22. The computer system of claim 21, wherein the interface also enables the node to be deleted from the first data structure.

23. The computer system of claim 20, wherein the processor changes a second node of the second data structure in response to a change made to a first node of the first data structure.

24. The computer system of claim 20, wherein the memory also stores information establishing a correspondence between a first node of the first data structure and a second node of the second data structure.

25. The computer system of claim 24, wherein the information is comprised of a pointer.

26. The computer system of claim 20, wherein the structure of the second data structure corresponds to a three-dimensional spatial function.

27. The computer system of claim 20, wherein the processor groups a plurality of state changes or mode changes into one node.

28. The computer system of claim 20, wherein the processor separates a geoset into two or more geosets, each of the geosets belonging to a separate node.

29. The computer system of claim 20, wherein the first data structure includes a plurality level-of-detail nodes, wherein each of the level-of-detail nodes corresponds to a different resolution for displaying the image.

30. The computer system of claim 20, wherein the first data structure includes a first node for modeling a curved surface according to a first representation and the second data structure includes a second node for modeling the curved surface according to a second, more exact representation.

31. The computer system of claim 20, wherein the second data structure includes a highlight node for highlighting one or more displayed elements.

32. The computer system of claim 20, wherein the processor automatically maintains a coherency between the first data structure and the second data structure under instructions from software stored in the memory so that when a user makes a change to the first data structure, the change is reflected in the second data structure transparent to the user.

33. A computer-readable medium having stored thereon instructions for causing a computer system to render and display an object on a display device according to the steps of:

creating a first scene graph which represents the entire image, wherein the first scene graph is viewable by the user;

storing the first scene graph in memory;

creating a second scene graph which represents the same entire image as the first scene graph, wherein the first scene graph and the second scene graph each independently describes the entire image, the first scene graph being organized to be optimally viewed by a user whereas the second scene graph being organized to optimally render the image;

storing the second scene graph in the memory;

accepting a change to the first scene graph made by the user;

changing the second scene graph to reflect the change made to the first scene graph;

rendering the image for display according to the second scene graph, wherein only information supplied by the second scene graph is used to render image.

34. The computer-readable medium of claim 33, wherein the instructions further comprise the steps of inserting, deleting, and modifying a plurality of nodes of the first scene graph.

35. The computer-readable medium of claim 34, wherein the instructions further comprise the steps of establishing and maintaining a correspondence between a first node of the first scene graph and a second node of the second scene graph.

* * * * *